L. R. CARROLL.
WOOD MOLDING MACHINE.
APPLICATION FILED APR. 21, 1913.
1,099,692.
Patented June 9, 1914.
5 SHEETS—SHEET 5.
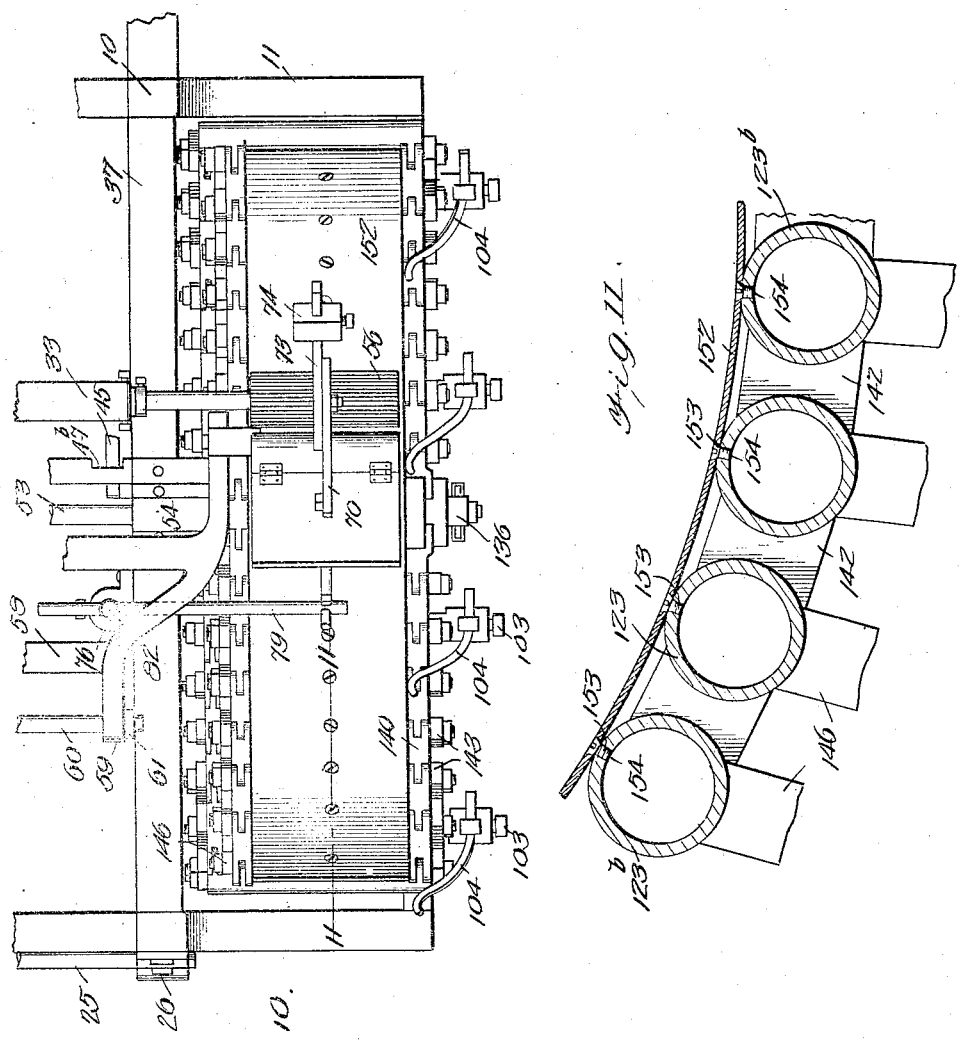

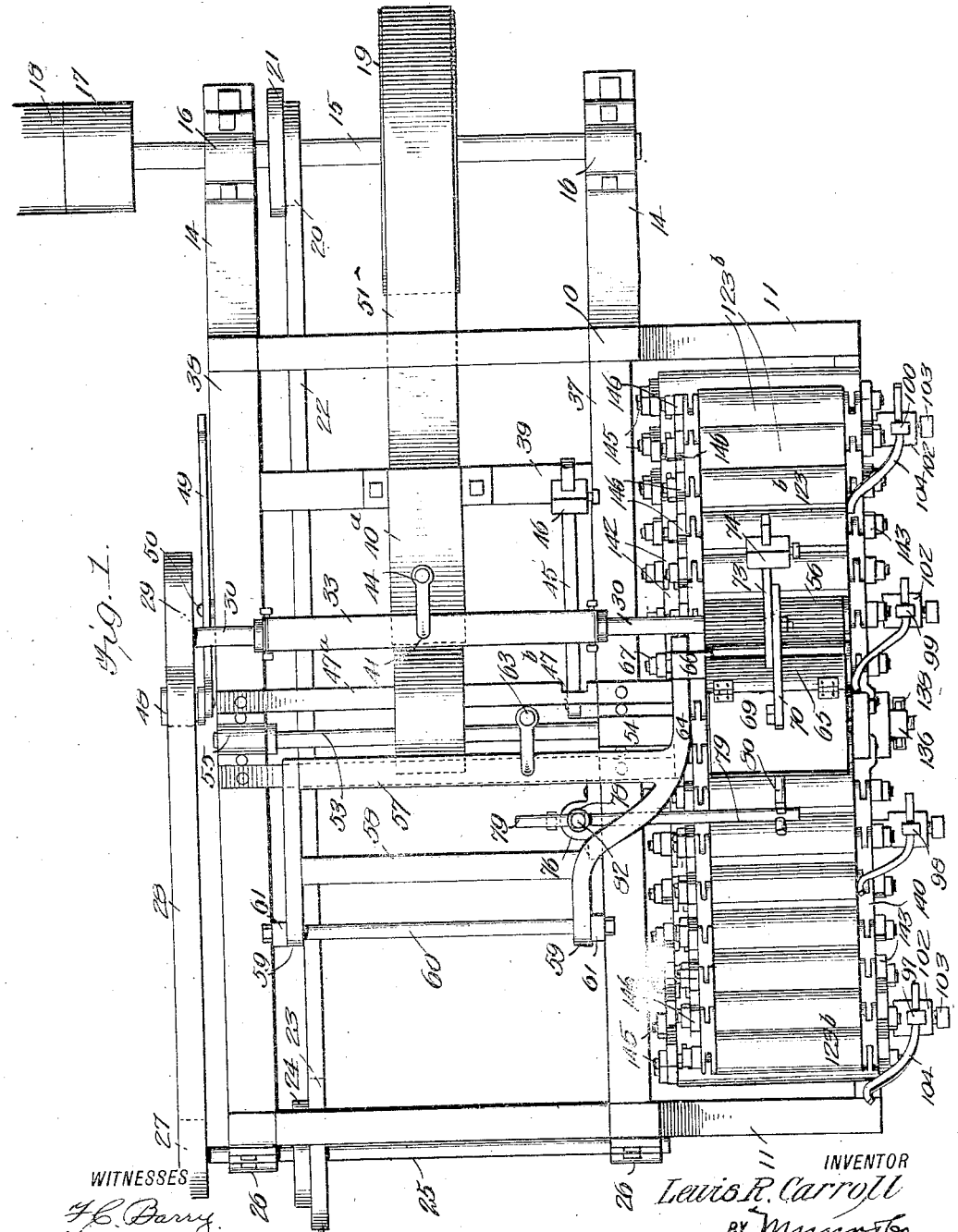

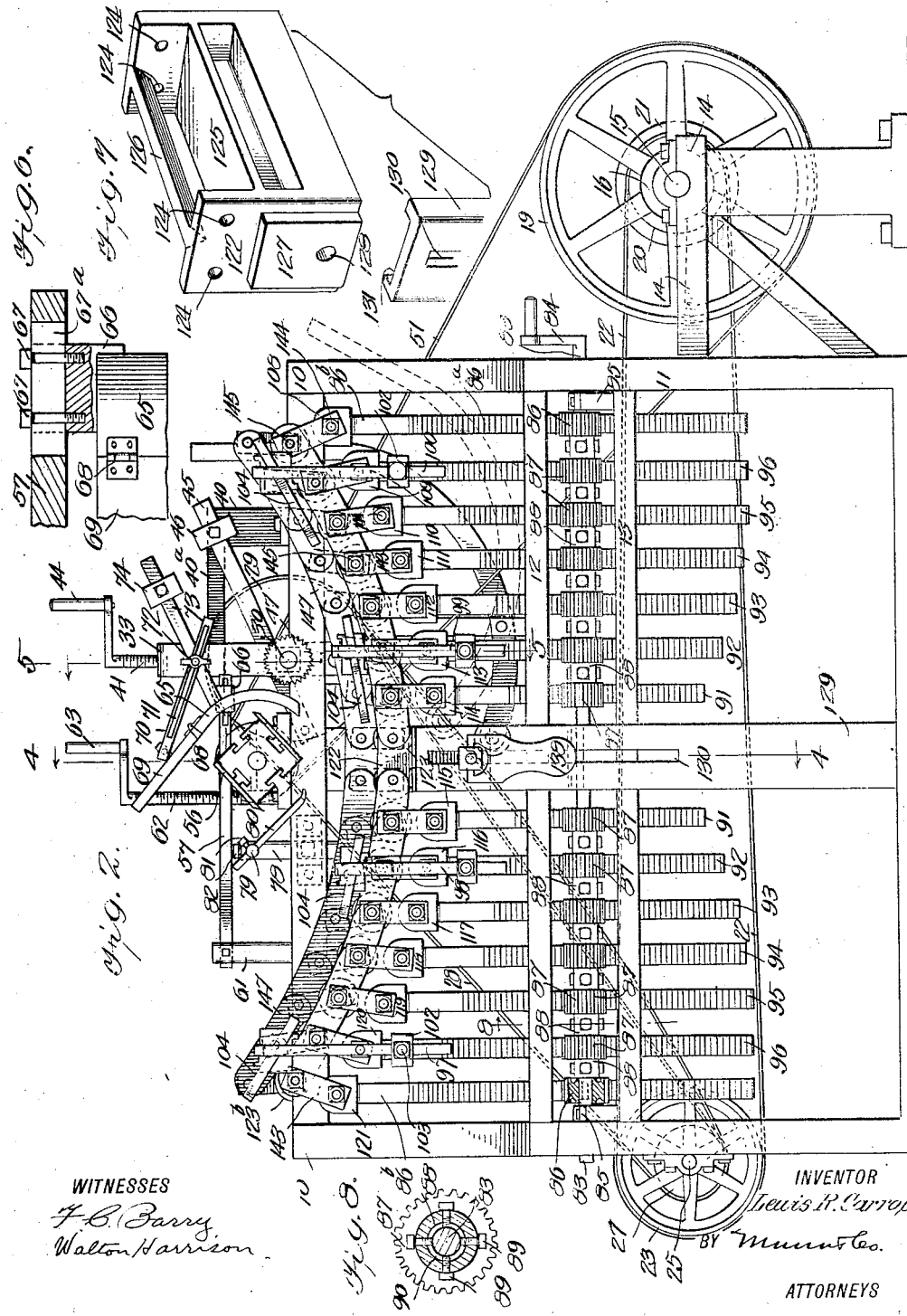

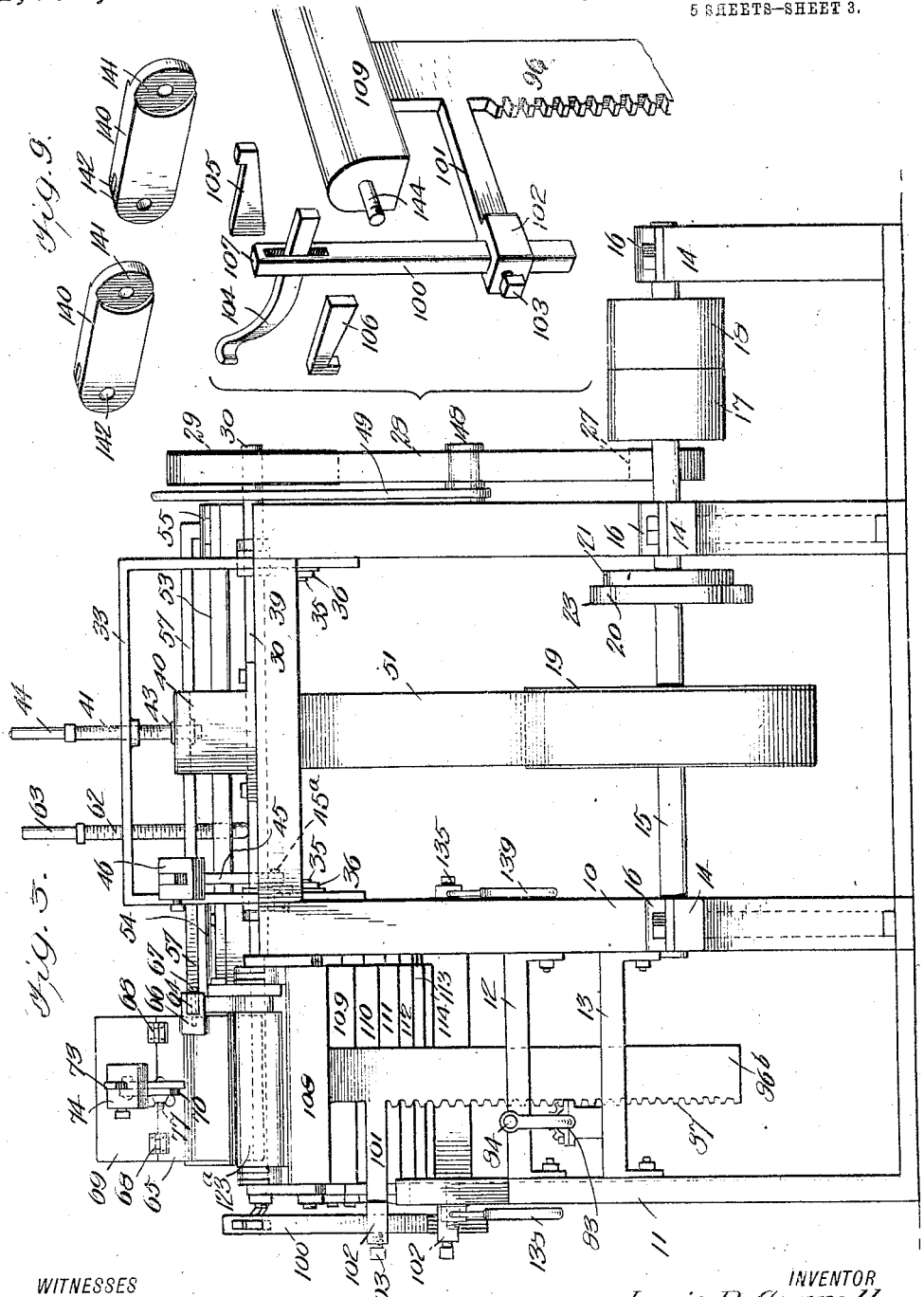

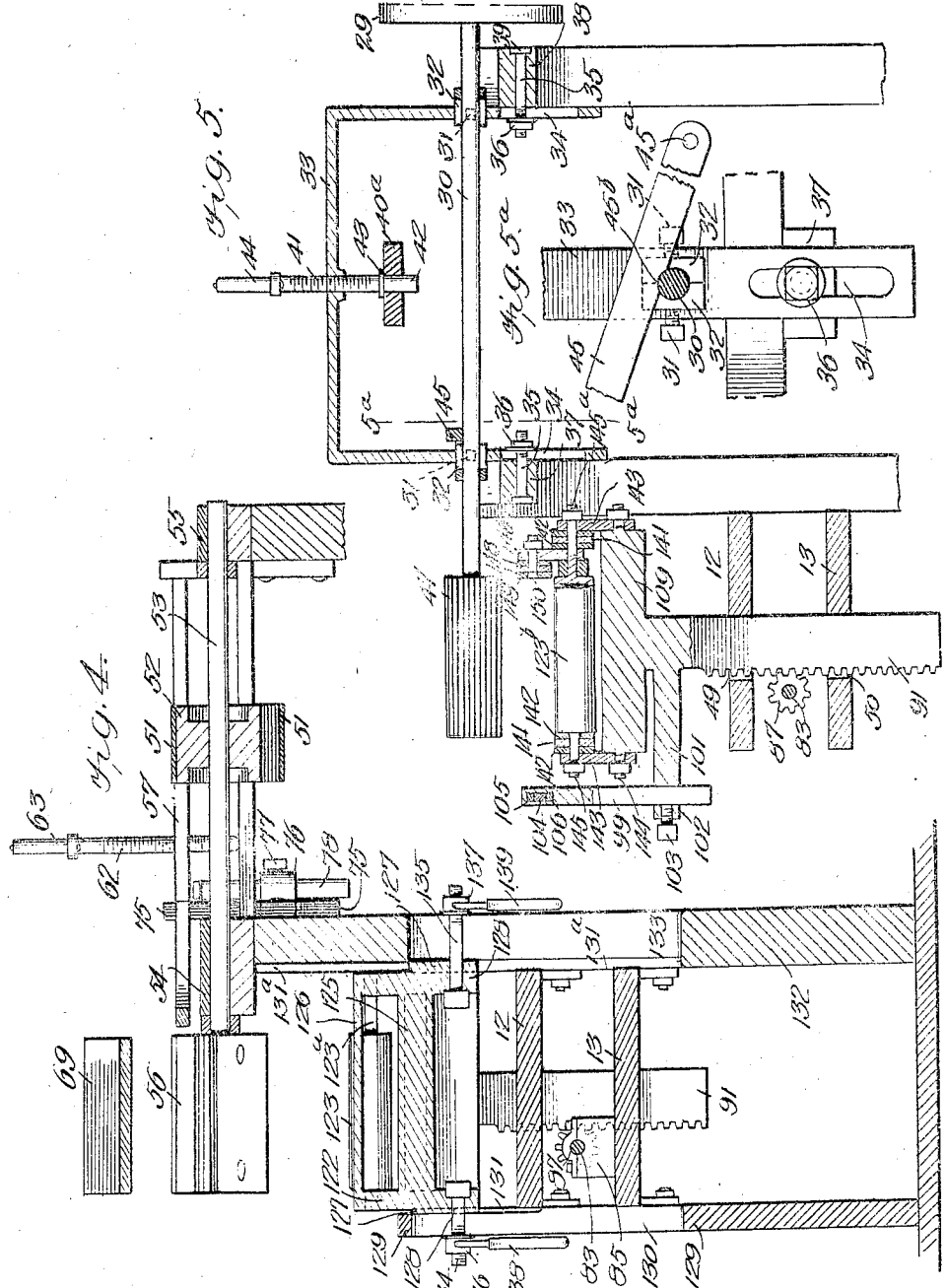

UNITED STATES PATENT OFFICE.

LEWIS R. CARROLL, OF CHARLOTTE, NORTH CAROLINA.

WOOD-MOLDING MACHINE.

1,099,692.　　　　Specification of Letters Patent.　　Patented June 9, 1914.

Application filed April 21, 1913. Serial No. 762,572.

*To all whom it may concern:*

Be it known that I, LEWIS R. CARROLL, a citizen of the United States, and a resident of Charlotte, in the county of Mecklenburg and State of North Carolina, have made certain new and useful Improvements in Wood-Molding Machines, of which the following is a specification.

My invention relates to wood molding machines of a kind suitable for making and dressing either straight moldings or curved moldings, as desired by the operator, and especially suitable for making so-called flat circle moldings of different radii, the radius being adjustble at the will of the operator.

My invention further contemplates a molding machine provided with a flexible bed and with means controllable at the will of the operator for curving said bed to any desired radius, said machine being further provided with means for raising and lowering the bed as a whole when thus curved,—the bed thus having a double adjustment in the sense that its adjustment as to curvature is independent of its adjustment bodily toward and from the cutter head.

My invention also contemplates an improved arrangement of the chip breaker whereby it may be adjusted in order to accommodate different positions for the adjustable bed and different shapes conferred upon said bed by adjusting the latter.

My invention further includes an improved feed roller and means for adjusting the same relatively to said adjustable bed.

My invention likewise contemplates flexible guides of improved form connected with the adjustble bed and rendered adjustable therewith for the purpose of directing the material to be operated upon by aid of said adjustable bed.

My invention also embraces improved guide rollers which, for ordinary work, are revoluble, but which may for special work be temporarily rendered rigid so as to support a sheet of flexible material serving as a bed surface and having no motion except such as is incidental to its adjustment to different curvatures.

In addition to the foregoing objects I seek to so arrange the various mechanical parts as to promote the safety of the operator and particularly to enable him to control the machine without any necessity for placing his hands dangerously near the cutter head while the latter is in motion.

I also seek to provide a number of improvements in molding machines of this general character for the purpose of promoting the efficiency thereof.

Reference is made to the accompanying drawings forming a part of this specification, and in which like letters indicate like parts.

Figure 1 is a plan view of my improved molding machine complete. Fig. 2 is a front elevation of the same. Fig. 3 is a side elevation showing the machine as it would appear to an observer standing at the right of Fig. 1. Fig. 4 is a section on the line 4—4 of Fig. 2, looking in the direction of the arrow. Fig. 5 is a section on the line 5—5 of Fig. 2, looking in the direction of the arrow. Fig. 5ª is a section on the line $x$—$x$ of Fig. 5, looking in the direction of the arrow. Fig. 6 is a section on the line 6—6 of Fig. 2 looking in the direction of the arrow. Fig. 7 is a detail showing in perspective the slidable center block of the adjustable bed. Fig. 8 is a section on the line 8—8 of Fig. 2, looking in the direction of the arrow. Fig. 9 is a detail showing a number of separate parts of the adjustable bed. Fig. 10 is a fragmentary plan view of the machine, showing it as arranged for work requiring unusual precision. Fig. 11 is a section on the line 11—11 of Fig. 10.

A frame 10 is provided with a forwardly extending portion 11, and supported within this portion are two fixed plates 12, 13, extending practically across the entire front of the machine. The frame is also provided with a portion 14 extending laterally from it. A driving shaft 15 is mounted in bearings 16, the latter being supported by the extending portion 14 of the frame. Mounted upon this shaft are fixed and loose driving pulleys 17, 18, and a belt pulley 19. Two smaller pulleys 20, 21, are secured upon the shaft 15, preferably connected together as a cone pulley. A belt 22 engages this cone pulley and extends across the rear of the machine so as to engage two other pulleys 23, 24, these pulleys also together constituting a cone pulley, as will be understood from Fig. 1. This cone pulley is mounted rigidly upon a revoluble shaft 25, the latter being journaled in bearings 26, and also carrying a small belt pulley 27. A belt 28 engages this pulley and also engages a belt pulley 29, the latter being mounted rigidly upon the feed roller shaft which is shown at 30.

The feed roller shaft is mounted in bearings 32 which are made in halves, as indicated in Fig. 5ª, and are adjustable by bolts 31. These bearings are carried by a yoke 33 shown more particularly in Fig. 5, and having substantially the form of an inverted U. This yoke is provided with slots 34 and extending through these slots are guide bolts 35 which are provided with nuts 36, and are supported by beams 37, 38, through which they extend. By adjusting the nuts 36, lost motion between the yoke 33 and the beams 37, 38, is prevented so that the yoke 33 may be quickly raised and lowered in a definite plane.

Extending across from the beam 37 to the beam 38 is a massive bar 39 and mounted upon this bar is a post 40 provided with a horizontally extending portion 40ª. A lifting screw 41 extends through a threaded opening in the yoke 33 and is provided with a smooth cylindrical bearing portion 42 (see Fig. 5) which extends through a hole in the horizontal portion 40ª of the post 40. The lifting screw 41 is further provided with an enlarged portion 43 resting directly on the horizontal portion 40ª. The lifting screw 41 is further provided with a hand crank 44 whereby it may be turned. The operator by grasping the hand crank and rotating the lifting screw 41 causes the normal position of the yoke 33 carrying the feed roller shaft 30 to be raised or lowered, the weight of the yoke normally resting upon the horizontal portion 40ª of the post 40.

A lever 45 is mounted upon a pivot pin 45ª and is provided with a notch 45ᵇ serving as a bearing, this notch resting against the feed roller shaft 30 and tending to press the yoke 33 downwardly, as will be understood from Figs. 5 and 5ª. Lever 45 carries an adjustable weight 46 as shown in Figs. 1 and 2. The feed roller is shown at 47 and is mounted rigidly upon the feed roller shaft 30. A cross bar 47ª (see Fig. 1) extends from the beam 37 to the beam 38 and is provided with a slot 47ᵇ into which the lever 45 may enter when pressed upwardly. The cross bar 47ª serves as a limiting stop for preventing upward excessive travel of the lever 45, and consequently of the yoke 33 and feed roller 47. Engaging the belt 28 is an idle roller 48 which is carried upon a hand lever 49, this lever being mounted upon a pivot 50 and serving to shift the position of the idle roller 48 so as to tighten or loosen the belt 28. Engaging the pulley 19 is the main driving belt 51. This belt also engages a pulley 52 which is mounted rigidly upon the cutter shaft 53. The cutter shaft is mounted in bearings, 54, 55 and carries a cutter head for the purpose of operating upon the stock. A swinging frame 57 is provided with a brace 58 having the form of a cross bar and is further provided with bearings 59, the latter being fitted upon a rod 60 which is carried by posts 61, these posts extending upwardly from the beams 37, 38, as will be understood from Fig. 1.

A lifting screw is shown at 62 and extends through a hole in the swinging frame 56, this lifting screw being provided with a hand crank 63 whereby it may be turned in order to raise and lower the adjacent portion of the swinging frame 57. This frame is provided with an arm 64 integral with it. Adjacent to the cutter head 56 is a chip breaker 65 having the form of a curved plate and connected rigidly with a sleeve 66 whereby it is supported. The arm 64 of the swinging frame 57 extends through the sleeve 66 and supports the latter. The sleeve 66 is adjustable relatively to the arm 64 and for this purpose is provided with adjusting bolts 67. By loosening these bolts the sleeve 66 may be moved slightly along the arm 64, and by tightening the bolt, the sleeve may be secured in the new position which it thus assumes. The distance between the chip breaker 65 and the cutter head 56 may thus be adjusted at the will of the operator. The bolts 67 extend through a slot 67ª and into the adjacent portion of the sleeve 66, as will be understood more particularly from Fig. 6. The chip breaker 65 is provided with a plate 69 connected with it by hinges 68. A bar 70 is pivotally connected with the plate 69 and is provided with a slot 71. A bolt 72 extends through this slot and also through an arm 73, this arm being secured rigidly upon the chip breaker 65 and extending radially outward therefrom, as will be understood from Figs. 2 and 3. The arm 73 carries a weight 74 adjustable relatively to it at the will of the operator. As the chips are severed by action of the rotary cutter head and are forced against the chip breaker 65, their pressure against the chip breaker may cause the swinging frame 57 to swing upward slightly in the event that the pressure of the chips becomes excessive. By adjusting the weight 74 relatively to the arm 73 the degree of pressure necessary to move the frame 57 may be controlled at will, the lifting of the chip breaker being thus rendered as sensitive as desired. By loosening the bolt 72, shifting the arm 70 in the general direction of its own length and tightening the bolt 72, the angular position of the plate 69 relatively to the chip breaker 65 may be also adjusted at the will of the operator. The angle at which the plate 69 is tilted determines to some extent the precise angular direction in which the chips are discharged. I find by experience that the efficiency of the chip breaker as a whole is greatly improved by thus rendering the plate 69 adjustable to different angles.

Mounted upon a plate 75 (see Fig. 4) is a bearing bracket 76 which is provided with a set screw 77. Extending vertically through the bearing bracket 76 is a post 78 which may be raised or lowered as desired, and when thus adjusted, is secured rigidly in position by turning the set screw 77. Extending through a hole in the upper end of the post 78 is a rod 79, this rod extending toward the front of the machine. A spring 80 extends diametrically through the rod 79 and is used for pressing the stock down upon the bed, as hereinafter described. A set screw 82 extends into the top of the post 78 and holds the rod 79 rigidly in position. By loosening the set screw 82 the rod 79 may be adjusted in the general direction of its length, and by tightening the set screw 82 the rod is thus firmly held in the position in which it is placed. By this means the spring 80 is adjustable toward and from the front of the machine.

A shaft 83, which because of its character I designate as a raising shaft, is provided at one of its ends with a hand crank 84 and extends practically the full width of the machine, as will be understood from Fig. 2. This shaft is mounted in bearings 85. Secured rigidly upon the shaft 83 adjacent the ends thereof are two gear wheels 86. Mounted loosely upon the shaft between the two gear wheels 86 are a number of other gear wheels 87 which, to outward appearances are similar to the gear wheels 86, but differ therefrom in being provided with hubs 88 integral with them, as indicated more particularly in Fig. 8. Each hub 88 carries a number of bolts 89 which extend radially inward and are fitted into a groove 90. The shaft 83 is provided with a groove 90 for each hub 88.

My purpose in having several bolts 89, (in this instance four) is to have some one of these bolts within easy reach of the operator, no matter in what position the hub may happen to stop. Only one of the bolts is used at a time, the other three being idle. When any one of the bolts is tightened, the hub is secured rigidly upon the shaft. The purpose of the groove 90 is to prevent the inner ends of the bolts from mutilating the bearing surface of the shaft. Whenever one of the bolts is tightened, a gear wheel 87 is locked rigidly upon the shaft and rendered revoluble therewith. Adjacent the two gear wheels 86 are two rack bars 86$^b$ provided with teeth 86$^a$, these teeth meshing with the teeth of the gear wheels 86. These rack bars are at all times under control of the shaft 83 for the reason that the two wheels 86 are always rigid relatively to the shaft, as above indicated. Located between the two rack bars 86$^b$ are a number of other rack bars 91, 92, 93, 94, 95, 96, which are substantially alike with the exception that they vary in length, as will be understood from Fig. 2, the shorter rack bars being adjacent the middle portion of the machine.

The rack bars numbered from 92 to 96 inclusive are not at all times under control of the shaft 83 for the reason that the gear wheels 87 may be loose relatively to the shaft, depending upon whether or not they are secured by the bolts 89. If these bolts are all loose and the shaft 83 is rotated by the hand crank 84, the racks 86$^b$ are raised or lowered positively while the rack bars numbered 91 to 96 inclusive, being free in so far as direct rotation of the shaft 83 is concerned, are adapted to take up different positions as controlled by the action of other parts hereinafter described. Four guide posts 97, 98, 99, 100, are severally mounted upon the four rack bars numbered 96, 92, 92, and 96, which are provided with bearing sleeves 102 for this purpose. Each guide post 97 extends through a bearing sleeve 102 to which it is adjustably secured by an adjusting bolt 103. The several guiding posts 97, 98, 99 and 100 are provided with guide springs 104 of the form shown more particularly in Fig. 9. Cotter wedges 105, 106 are used in connection with the springs 104 for holding the latter within the guide post 100 and for rendering the guide springs adjustable. Each guide post is provided with a slot 107 for holding a guide spring and two cotter wedges, as will be understood from Fig. 9. The rack bars are severally provided with longitudinal heads 108, 109, 110, 111, 112, 113, 114, 115, 116, 117, 118, 119, 120, 121, these heads being substantially alike, and each having its upper surface rounded, as will be understood from Fig. 9.

A sliding block 122 having the form indicated in Fig. 7 is located within the front extension 11 of the framework and is adapted to be adjusted to different positions in a vertical plane, as may be understood from Fig. 4. This block carries two rollers 123 carried by shafts 123$^a$ (see Fig. 4) and to facilitate mounting these shafts the block 122 is provided with holes 124, as indicated in Fig. 7. The block is further provided with strengthening ribs 125, 126, and with massive tongues 127. The block is further provided with holes 128. The front extension of the frame is provided with a central post 129, this post having a vertically disposed slot 130 extending through it.

The tongues 127 carried by the block 122 extend into grooves 131, which guide the block in its vertical movements or adjustments. Back of the central post 129 is a second center post 132 which is provided with a slot 133 extending vertically and merging into the groove 131$^a$ as indicated in Fig. 4. The block 122 carries two bolts 134, 135, extending outwardly through the holes 128 in opposite directions, these holes also extending through the slots 130, 133.

Nuts 136, 137 are fitted upon these bolts and connected with these nuts and depending therefrom are wrench handles 138, 139, whereby the nuts may be turned. The operator by grasping the wrench handles 138, 139, and turning the nuts 136, 137, may render the block 122 rigid or loose, as desired, relatively to the framework. The block 122 may thus be adjusted to any desired height permissible by the length of the slots 130, 133, and then locked rigidly in the position in which it is thus placed. A number of links 140 (see Fig. 9) are each provided at one end with an eye 141, and at the opposite end with two eyes 142, these links being of proper form to be fitted end to end in order to form chains. A number of swinging links 143 are pivotally mounted upon the stems 144 extending from the head 109. These links 143 are also fitted upon pins 145, carried by the rollers $123^b$. These pins also extend through eyes 141, and 142 of the links 140 and thus hold these links together in the form of chains which are parallel with each other and are supported by the links 143. A number of links 146 are journaled upon the pins $145^a$ and extend upwardly therefrom. These links at their upper ends support a number of chain links 147 each provided at one of its ends with an eye 148 and at its opposite end with an eye 149, these eyes being similar to the links 140 shown in Fig. 9. The links 147 are connected together by pins 150 and are formed into a chain, the outer face of which is substantially in registry with the inner ends of the rollers 123, and $123^b$. These rollers, together with the two chains crossing the ends thereof and the single chain registering with the ends of the rollers and located above the same, constitute the flexible bed upon which the stock rests. The upper chain is used to guide the stock, and for this purpose coacts with the springs 104.

Where delicate work is to be done I sometimes prefer to use the attachment shown in Figs. 10 and 11. For this purpose the rollers 123, $123^b$ are each provided with threaded holes. I secure a thin sheet of flexible steel 152 upon the rollers. This sheet of steel is provided with holes 153 and in these holes I place screws 154, these screws extending into the rollers. This prevents the rollers from turning, and the steel sheet affords a smooth practically continuous surface over which the stock may glide. In using the form shown in Figs. 10 and 11, the various adjustments of various other parts are employed as in connection with the mechanism shown in the other figures.

The operation of my device is as follows: The parts being assembled and arranged as described, the operator determines whether he wishes to make the moldings straight or curved. If the moldings are to be straight, he adjusts the flexible table so that it becomes horizontal, and then raises or lowers it bodily until it is located at the proper distance below the cutter head, the table being firmly clamped in the position into which it is thus brought. The various adjustable parts being now adjusted as elsewhere described, the stock is fed on to the flexible bed against which it is pressed by the feed roller, and as the stock passes beneath the cutter head it is cut to the required thickness. If the molding to be made is to be curved, the bed is adjusted to the proper curvature, as indicated in Fig. 2. This being done, the various adjustable parts are adjusted as described, and the work is fed through the machine as before.

I will now describe the manner in which the flexible bed is curved to different degrees for the purpose of making moldings of different curvatures. Such of the bolts as are screwed up tight are loosened so that the wheels 87 are rendered loose upon the shaft 83, the hand crank 84 being in the meanwhile turned so as to bring the ends of the flexible bed down into their lowermost positions. The hand crank 84 is now turned so as to rotate the two gear wheels 86 and thus raise positively, the two rack bars $86^b$. The wrench handles 138 and 139 are next turned so as to loosen the nuts 136, 137. This allows the bed to lift from its ends. The hand crank 84 is next rotated so as to lower the rack bars $86^b$. This brings the ends of the bed into their lowermost positions so that the bed is now horizontal. The wrench handles 138, 139 are now turned so as to tighten the nuts 136, 137, the middle portion of the bed being thus effectively clamped in a stationary position. The hand crank 84 is next turned so as to raise the rack bars $186^b$. The ends of the flexible bed are thus carried upwardly, and the required degree of curvature is thus conferred upon the bed. The higher the rack bars $86^b$ are carried, the sharper becomes the curvature of the bed. When the required curvature is attained, the gear wheels 87 are rendered rigid relatively to the shaft 83, which is done as above explained by turning some one of the bolts 89 carried by each of the hubs 88. In doing this the flexible bed is rendered comparatively rigid in its curved form. The wrench handles 138, 139 are now again turned so as to release the middle portion of the bed. Then by again turning the hand crank 84 the bed as a whole is lifted bodily and may be brought to any desired level. This being done, the wrench handles 138, 139 are again turned to tighten the nuts 136, 137, and the flexible bed as a whole is thus supported at the desired height. The various adjustable parts are now arranged accordingly, and the stock to be operated upon is fed through the machine. In the form shown in Figs. 10, 11, the operation is essentially the same, the only difference being that as the stock is fed through the machine the rollers do not turn, the stock merely gliding over the surface of the steel sheet. Owing to the evenness of this surface as compared with the interrupted supporting surface afforded by the rollers, the refinement of the curvature is carried much farther and on this account I prefer to use the mechanism shown in Figs. 10 and 11, for work of great delicacy.

I do not limit myself to the precise construction shown, the scope of my invention being commensurate with my claims.

I claim:—

1. A wood molding machine comprising a cutter, a flexible bed disposed adjacent to said cutter, a plurality of rack bars connected with different portions of said flexible bed for bending the same, said rack bars being movable independently of each other, a plurality of toothed wheels engaging said rack bars and means for detachably connecting all of said toothed wheels rigidly in relation to each other so as to render them immovable relatively to each other.

2. A wood molding machine comprising a cutter, a flexible bed located adjacent said cutter for the purpose of supporting stock to be cut, two rack bars connected with the ends of said flexible bed for raising the said ends, toothed wheels engaging said rack bars, means for holding the middle of said bed while said ends are being raised for the purpose of curving said bed, intermediate rack bars for supporting said bed between the middle and the ends thereof, toothed wheels engaging said intermediate rack bars, and mechanism controllable at the will of the operator for turning all of said toothed wheels for the purpose of raising and lowering the bed bodily.

3. A wood molding machine comprising a cutter, a flexible bed disposed adjacent to the cutter, a plurality of independently movable rack bars connected with different portions of said flexible bed for bending and raising and lowering the same, a plurality of toothed wheels in engagement with said rack bars, a shaft on which said toothed wheels are loosely mounted, and means for independently locking each of said toothed wheels to the shaft for the purpose described.

4. A wood molding machine comprising a cutter, a flexible bed located adjacent said cutter, two rack bars connected with the ends of the said flexible bed for raising said ends, an adjusting shaft, toothed wheels engaging said rack bars and secured on the adjusting shaft, a clamp engageable with the center of the flexible bed for holding the same while the ends of the bed are being raised for the purpose of curving the same, intermediate rack bars connected with and supporting the said bed between its center and its ends, toothed wheels engaging said intermediate rack bars and loosely mounted on the said adjusting shaft, and means for independently locking each of the last mentioned toothed wheels upon the shaft for the purpose described.

5. A wood molding machine comprising a cutter, a flexible bed disposed adjacent to said cutter, means controllable at the will of the operator for adjusting the general position of said flexible bed relatively to said cutter, a feed roller for holding the stock upon said flexible bed and in reach of said cutter, and means for adjusting said feed roller relatively to said flexible bed.

6. A wood molding machine comprising a revoluble shaft, two gear wheels mounted rigidly thereupon, rack bars engaging said gear wheels and adapted to be raised and lowered positively when said shaft is turned, a flexible bed connected at its ends with said rack bars, means for securing said bed adjacent its middle portion for the purpose of preventing said middle portion from following movements of the ends of said bed, a plurality of rack bars connected with said bed and located between the middle and the ends thereof, a plurality of gear wheels mounted loosely upon said shaft and engaging said last mentioned rack bars, and means controllable at the will of the operator for locking said last mentioned gear wheels rigid relatively to said shaft.

LEWIS R. CARROLL.

Witnesses:
P. YORK,
R. G. CAMPBELL.